Dec. 24, 1968 G. I. WILLIAMS ET AL 3,418,043

APPARATUS FOR DISPLAYING CHARACTERS SELECTABLE BY DIGITAL DATA

Filed May 5, 1966 5 Sheets-Sheet 1

INVENTORS
GERALD I. WILLIAMS
JOSEPH H BOUCHER
JOHN M. DUFFY
WAYNE L. OLSON
BY Cushman, Darby & Cushman
ATTORNEYS INVENTORS
GERALD I. WILLIAMS
JOSEPH H. BOUCHER
JOHN M. DUFFY
WAYNE L. OLSON
BY Cushman, Darby & Cushman
ATTORNEYS INVENTORS
GERALD I. WILLIAMS
JOSEPH H. BOUCHER
JOHN M. DUFFY
WAYNE L. OLSON
BY Cushman, Darby & Cushman
ATTORNEYS INVENTORS
GERALD I. WILLIAMS
JOSEPH H. BOUCHER
JOHN M. DUFFY
WAYNE L. OLSON
BY Cushman, Darby & Cushman
ATTORNEYS INVENTORS
GERALD I. WILLIAMS
JOSEPH H BOUCHER
JOHN M. DUFFY
WAYNE L. OLSON
BY Cushman, Darby & Cushman
ATTORNEYS

United States Patent Office 3,418,043

Patented Dec. 24, 1968

3,418,043

APPARATUS FOR DISPLAYING CHARACTERS SELECTABLE BY DIGITAL DATA

Gerald I. Williams, Minneapolis, Joseph H. Boucher, Hopkins, and John M. Duffy and Wayne L. Olson, Minneapolis, Minn., assignors to Central Data Corporation, Minneapolis, Minn., a corporation of Minnesota Filed May 5, 1966, Ser. No. 547,888
6 Claims. (Cl. 353—25)

ABSTRACT OF THE DISCLOSURE

Apparatus for displaying characters or symbols selectable by digital data, the format being suitable for visual interpreation. The device includes a mechanism for directly converting binary data to a format suitable for visual interpretation.

This invention relates to apparatus for displaying characters or symbols selectable by digital and, in particular, binary data, the format being suitable for visual interpretation. In particular, this invention relates to mechanical means for directly converting binary data to a format suitable for visual interpretation.

In prior art data displays, electronic decoding circuitry translates the binary signal to a signal which actuates the visual display. For instance, one method employs a diode matrix decoding system for display of a character or piece of information. The decoded signal actuates one of a plurality of projection lamps, each lamp corresponding to a particular display character. On actuation of a lamp, a character corresponding to the particular lamp is projected by a projection lens (also uniquely corresponding to the actuated lamp) onto a screen for visual interpretation. Hence, it can be seen that a plurality of projecting systems are required to respectively handle the characters displayed. This results in a needless expenditure of hardware to accomplish the display function.

Other character display apparatus do not necessarily resort to the involved electronic decoding mentioned above, but do involve unnecessary extraneous actuations. For instance, in another system each display character is printed on a separate plate. The binary data is decoded and a particular plate is electromagnetically moved in such a way that the desired character is moved into the projection system of the display, thereby causing this character to appear on the display screen. However, the decoding is enabled by the use of auxiliary magnetic systems which introduce the unnecessary extraneous actuations mentioned above. This system requires additional electrical power and the characters are not on the same plane, thereby resulting in a fairly expensive unit.

Another prior art display unit involves moving a screen having a plurality of numbers or characters around the periphery thereof into a proper position in a projecting system. This screen is positioned by passing the proper magnitude of current through a coil which is in a magnetic field, the screen being attached to the coil and the coil being free to rotate and assume various different positions with different currents. Depending on the magnitude of the current, the desired character is positioned within the projection system. In this system there is necessarily a need for an electronic decoding system to convert the binary data into the proper magnitude of current for positioning the coil. Once again this circuitry becomes involved and expensive.

In some applications it is possible that hundreds of these displays may be required. Further, the number of applications in which these displays are required is increasing as the need increases for visually interpreting computer contents or other information which is stored within various types of apparatus in binary form. In light of the large number of these displays which are used in ever increasing applications, a definite need has arisen to provide a display which is significantly less expensive than the prior art displays, such as those described above, which at the same time meets high standards of reliability and longevity. Although typically this invention is used to convert binary data to characters suitable for visual display, it is possible to also use the teachings and methods of this invention in other types of display devices—for example, if a four level or quaternary code is employed, it would also be possible to employ the teachings of this invention to provide an economical display of the information.

Thus it is an object of this invention to provide improved character display which is significantly less expensive than character displays heretofore known.

It is a further object of this invention to provide an improved character display means which meet high standards of reliability and longevity.

It is another object of this invention to provide an improved character display means which electromechanically decode digital data applied thereto.

It is another object of this invention to provide improved means for displaying characters selected by digital data, said means mechanically positioning a desired character in a projection system for character display in direct response to the digital data.

Other objects and advantages of this invention will become apparent to those of ordinary skill in the art upon reading the appended claims and the following detailed description of an illustrative embodiment of the invention, in conjunction with the drawings, in which:

Figures 1, 3:
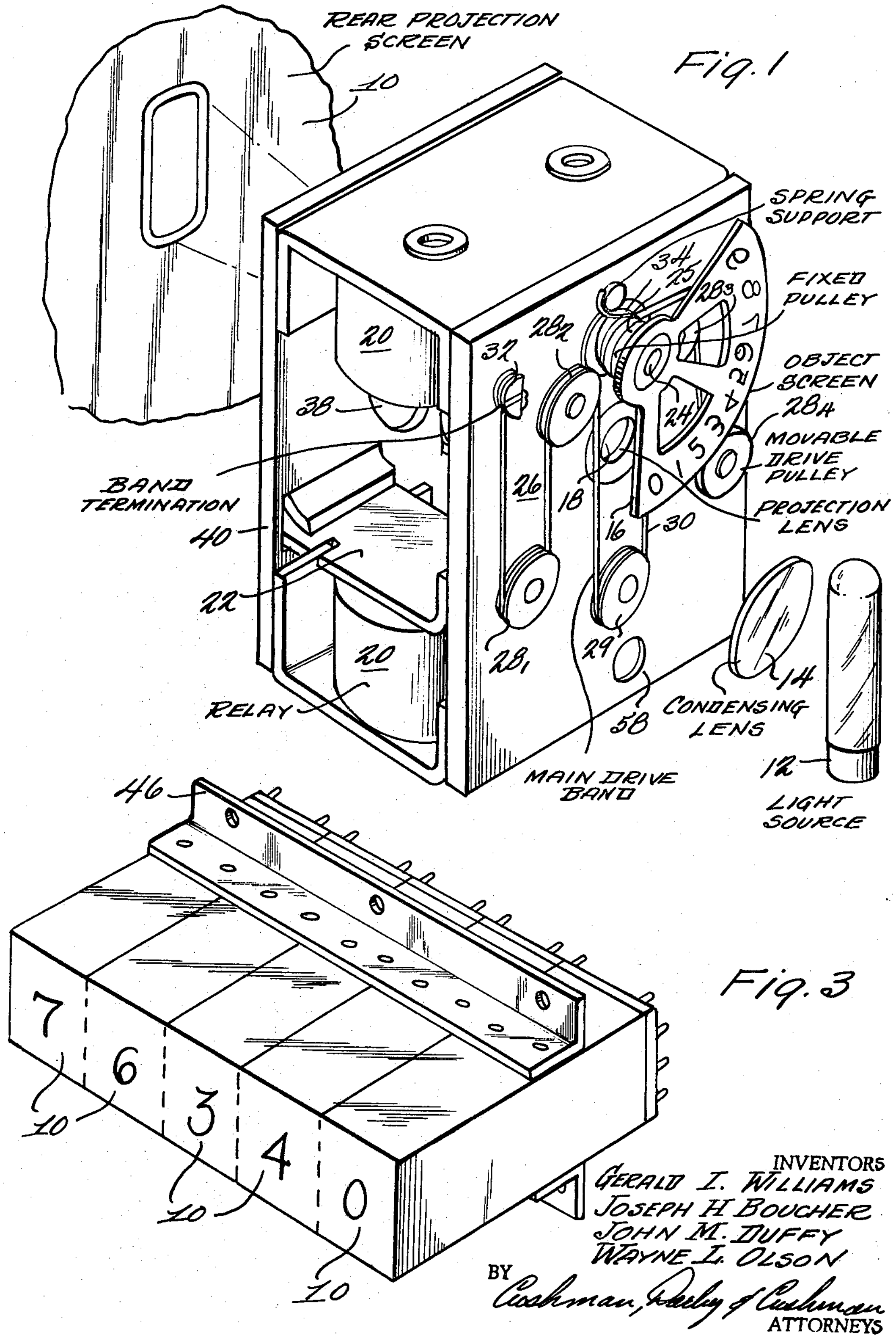
FIGURE 1 is an isometric view of an illustrative embodiment of the invention.
FIGURE 3 is a view of complete assembled units in a line, where each unit corresponds to the embodiments shown in FIGURES 1 and 2.

Referring to FIGURE 1 which shows an isometric view of an illustrative embodiment of the invention, a rear projection screen or image screen 10 is shown with the numeral zero displayed thereon. The numeral zero is projected onto the image screen by a projection system comprising a light source 12, a condensing lens 14, a movable image mask or member 16, and a projection lens 18. The light from the source 12 is focused by the lens 14 onto the numeral zero incorporated into the image mask, thereby providing an illuminated image which projection lens 18 can project onto the display screen 10, properly magnified. The display screen 10 is made of a suitable material such that viewing takes place from the side opposite that on which the numeral zero is displayed.

The image mask 16, shown in FIGURE 1, incorporates the numerals 0 through 9. Of course, it will be understood that any sort of characters or legends may be incorporated into the image mask 16; therefore, for purposes of this specification and the appended claims, the term "image will be used to generically cover the various types of characters or legends which may be incorporated into the image mask 16. This mask 16 may be a semicircular disc of photographic film with the "images" disposed around the periphery thereof.

As stated above, for purposes of illustrating this invention, the numerals 0 through 9 are incorporated into the image mask 16. To completely represent any one of these ten decimal digits, four binary bits are required. Four actuators 20 are provided which are respectively responsive to the four binary bits. (Only two of these actuators are diagrammatically shown in FIGURE 1.) The clappers or armatures 22, controlled by these actuators, are instrumental in positioning the mask 16 within the projection system in accordance with the value of the binary data applied to the actuators 20.

If a binary five is applied to the actuators 20, the image mask 16 is rotated about a shaft 24 until the numeral five is positioned within the projection system, thus enabling the projection system to display this numeral on the image screen 10.

Pulley adder means generally indicated at 26 provides a mechanical linkage between the clappers of the actuators 20 and the image mask 16. The pulley adder means basically comprises a plurality of movable drive pulleys $28_1$–$28_4$ interconnected by a main drive band or cable means 30. A band termination 32 mounted on support member 58, together with spiral spring 34 bias the rotation of the image mask 16 so that the numeral zero is normally positioned within the projection system.

The four actuators 20 respectively actuate the drive pulleys $28_1$–$28_4$. Further, the four actuators 20 are respectively associated with the four bits of binary data applied to the unit. Therefore, when the binary numeral five is applied to the display unit, the actuators 20 respectively associated with movable drive pulleys $28_1$ and $28_3$ are energized, thereby causing translational movement of the pulleys $28_1$ and $28_3$. This translational movement results in the rotation of image mask 16 as stated above and as will be described in more detail hereinafter.

Figure 2:
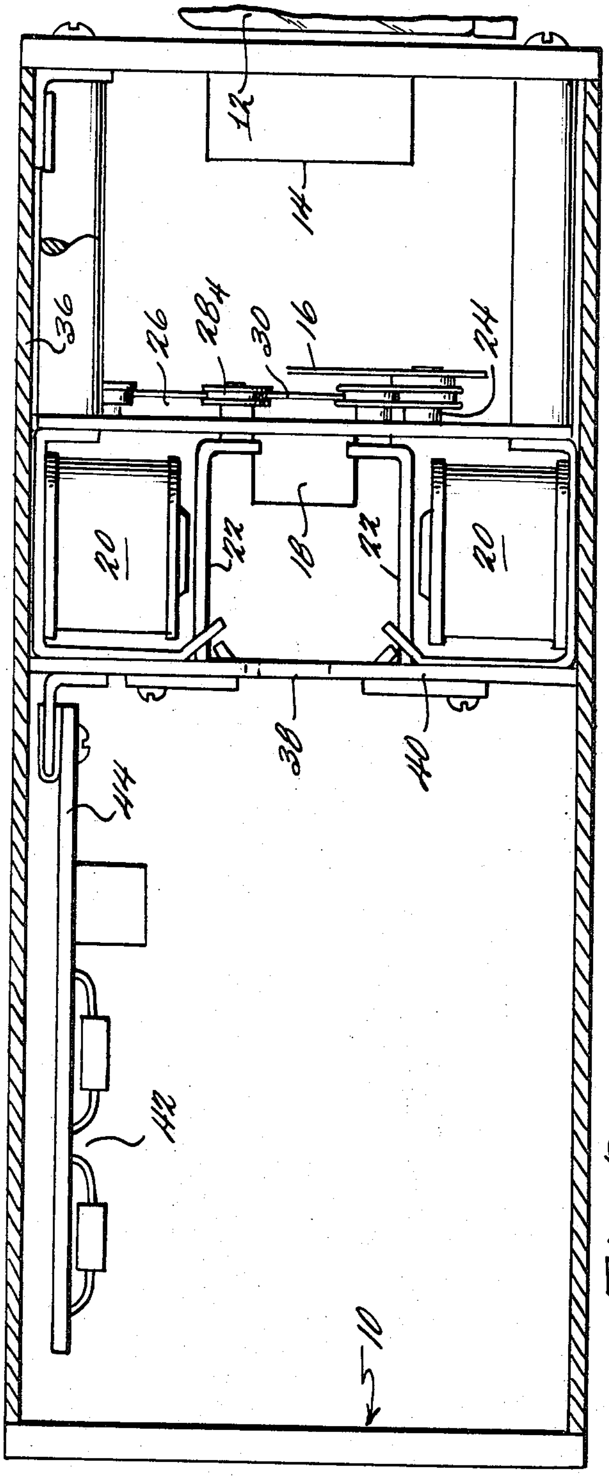
FIGURE 2 is a schematic side view of the embodiment shown in FIGURE 1, together with an enclosing case therefor.

Reference should now be made to FIGURE 2 which shows a schematic side view of the embodiment shown in FIGURE 1, together with an enclosing case or housing 36 therefor.

The housing 36 completely contains the display unit except for the lamp 12 which is positioned adjacent thereto, as shown in FIGURE 2. Most of the components described in FIGURE 1 are also shown in FIGURE 2 to further illustrate the manner in which these various components may be organized in an operational display unit. It should be noted in FIGURE 2 that an aperture 38 is provided in the plate 40, through which passes the projected image onto the screen 10. Also mounted on plate 40 is the electrical circuitry which connects the binary electrical signals to the actuators 20. These electrical components are diagrammatically indicated at 42. The components 42 are mounted on a board 44 which is connected to the plate 40. Because of the length of the chamber defined between the plate 40 and the image screen 10, the electrical components 42 may be conveniently mounted within this chamber without crowding of the components, while at the same time these components are out of the way of the beam of light projected upon the screen 10.

Referring now to FIGURE 3, there is shown a view of complete assembled units in a line, where each unit corresponds to the embodiments shown in FIGURES 1 and 2. The units may be conveniently connected together by the brackets 46 as shown.

Figure 5:
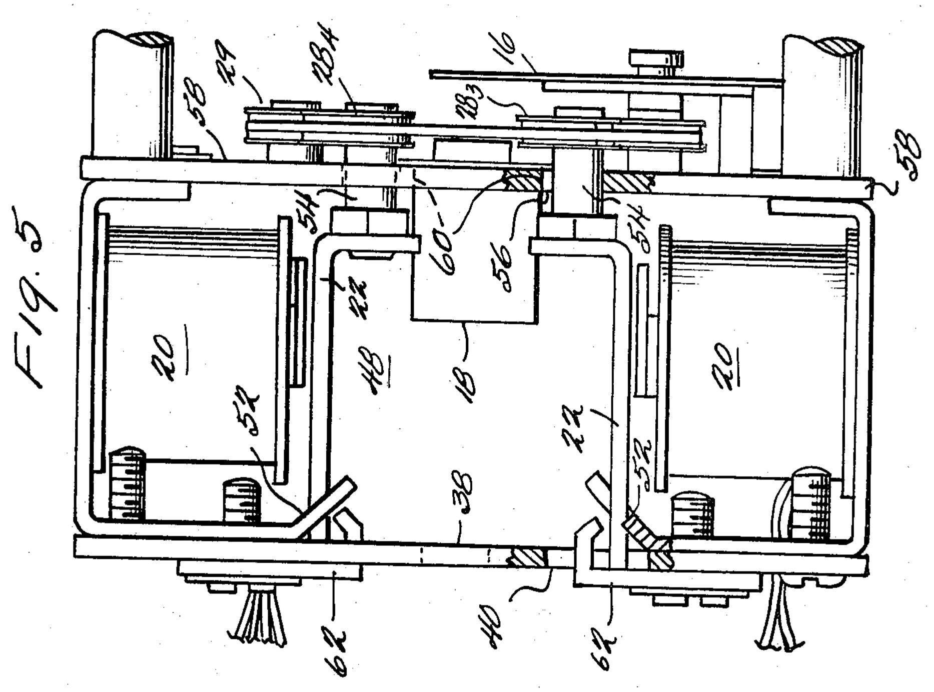
FIGURE 5 is a side view of the mechanism shown in FIGURE 4.
Figure 4:
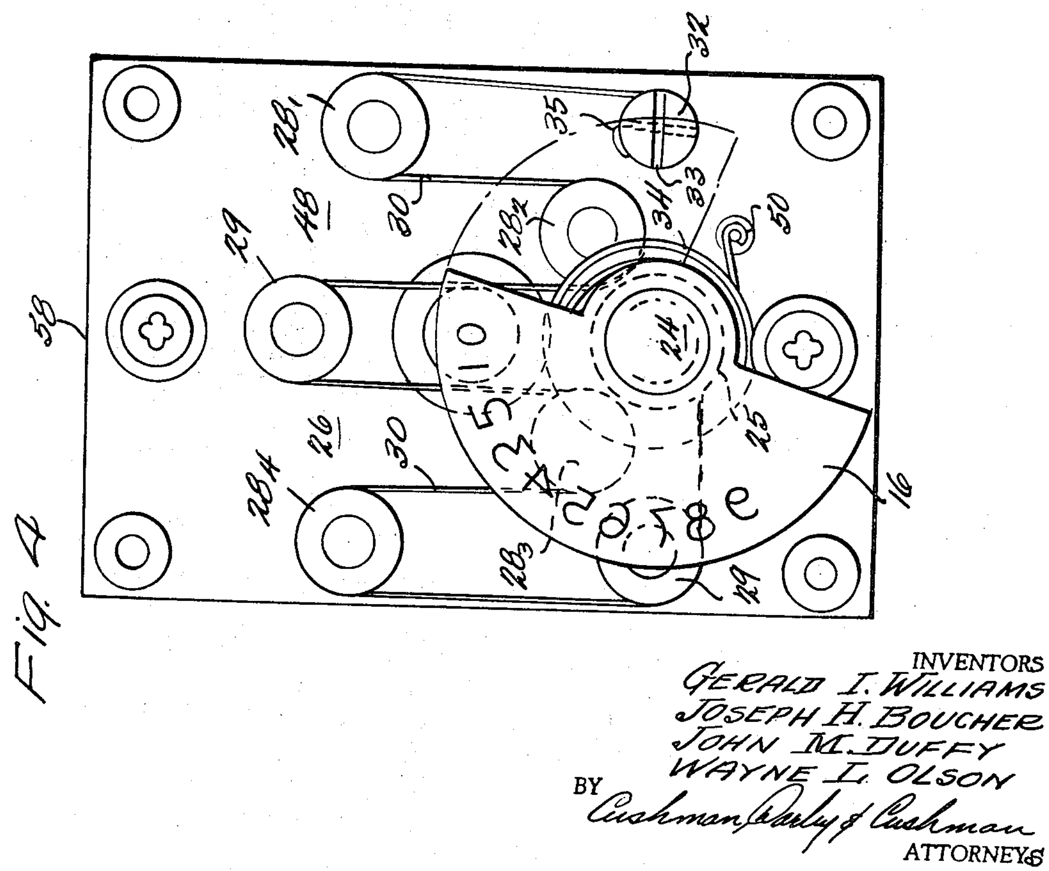
FIGURE 4 is a rear view of the mechanism for moving an image mask.

Referring now to FIGURES 4 and 5, there are respectively shown rear and side views of the drive mechanism or means 48, together with the image mask 10 suitable for converting binary data to decoded digits. Basically, the drive mechanism 48 comprises the actuators 20 and the pulley adder means 26 which together position the image mask within the projection system as described with respect to FIGURE 1. The pulley adder means 26 comprises a plurality of movable drive pulleys $28_1$–$28_4$, which are interconnected by the drive band 30, the band being connected at one end to a band termination 32 and the other end to a fixed pulley 25 rotatably mounted on the shaft 24.

The fixed pulley 25 is biased to rotate around the shaft 24 in one direction because of the spiral spring 34 which is connected to the pulley 25. The other end of spring 34 is connected to a spring support 50 which is mounted on the support member 58. The image mask 16 is also connected to the fixed pulley 25 so that rotation of the pulley 25 also rotates the image mask 16. Translational movement of the movable drive pulleys $28_1$–$28_4$ transmits a rotational movement to the fixed pulley 25 over the drive band 30, which may be made of a fiber glass material. Fixed idler pulleys 29 are also provided to transmit the translational movement of the pulleys $28_1$–$28_4$ to the fixed pulley 25.

The band termination member 32 comprises a post with a screw drive adjustment slot 33. The drive band is connected to the termination member 32 at point 35. By rotating the member 32, the band 30 is wound upon the post. The termination member 32 is normally adjusted so that the numeral zero, incorporated within the image mask 16, is positioned within the projection system. Thus the numeral zero may broadly be termed a reference position for the display unit, the reference position corresponding to the absence of binary data applied to the display unit.

Figure 6:
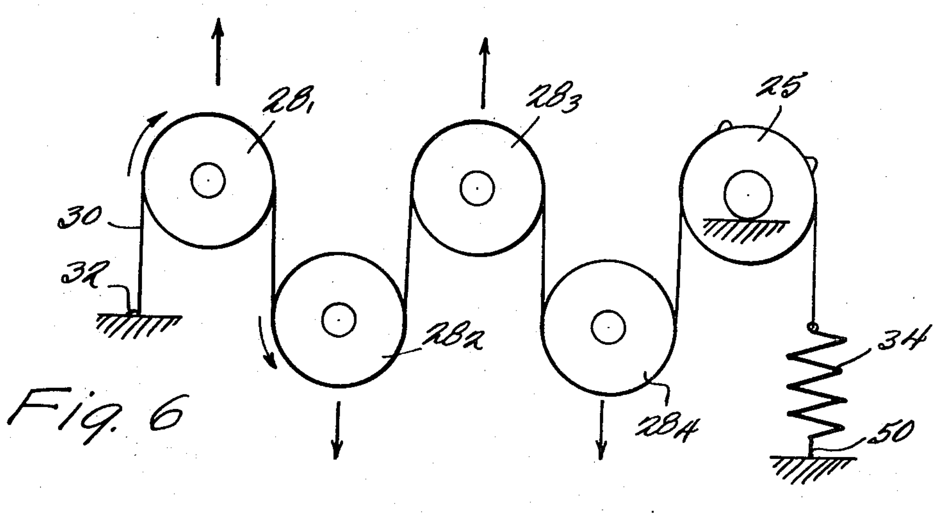
FIGURE 6 is a schematic showing a pulley adder arrangement.

Before further detailed description of the drive mechanism 48 is given, reference should be made to FIGURE 6 which schematically shows a pulley adder arrangement. The movable drive pulleys $28_1$–$28_4$, together with the fixed pulley 25 and the coil spring 34 are schematically shown in FIGURE 6. The drive band 30 is terminated at a point which corresponds to the termination member 32 and the spring 34 is terminated at the fixed pulley 25 and at a point corresponding to the spring support 50. Although the image mask 16 is not shown in FIGURE 6, it may be assumed that it is connected to the fixed pulley 25 and that with the pulley adder in the position shown in FIGURE 6, the reference numeral zero is positioned within the projection system. The movable pulleys $28_1$–$28_4$ are respectively limited in their translational movement (in the directions indicated by the arrows) to one, two, four, and eight units. In particular, pulleys $28_1$–$28_4$ may be respectively limited in their movement to .010, .020, .040 and .080 inch. Of course, other choices could be employed in determining the amount of movement which the pulleys $28_1$–$28_4$ are limited to. This would depend upon the particular characters being displayed. Further, if an octal display unit were desired, it would be obvious that only three of the movable pulleys 28 would be required and their movements would respectively be limited to one, two and four units.

The translational movement of movable pulley $28_1$ one unit in the direction indicated by the arrow, would rotate the fixed pulley 25 one unit, thereby moving the image mask 16 one discrete increment or unit and positioning the numeral one within the projection system. This would, of course, correspond to a binary one being applied to the display unit.

If a binary five were applied to the display unit, the movable drive pulley $28_1$ would move one unit, as described above, and the movable drive pulley $28_3$ would move four units. The combined or accumulative translation of the pulleys $28_1$ and $28_3$ are transmitted over drive band 30, thereby imparting rotational movement to the fixed pulley 25 and positioning the image mask 16 such that the numeral five is positioned within the projection system for display thereof.

Thus it may be seen that pulley adder does indeed perform the addition operation since the respective translational movement of pulleys $28_1$ and $28_3$ of one and four units result in an accumulative rotational movement of the image mask 16 of five units or increments. Further, note that the pulleys $28_1$–$28_4$ respectively correspond to increasing order bits of the binary input data, although it is not necessary, of course, that the correspondence be with increasing order bits since in some applications it might be desirable to associate pulley $28_3$, for example, with the lowest order bit.

Figure 8:
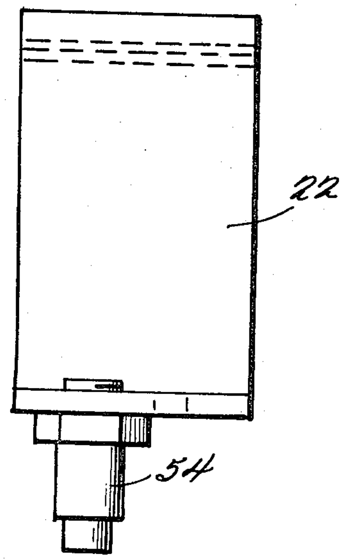
FIGURE 8 is a side view of a clapper assembly employed in the illustrative embodiment of the invention.

Returning now to FIGURES 4 and 5, reference should now be made to FIGURE 5 which shows the actuators 20, together with the armatures or clappers 22 respectively associated therewith. Each actuator is independent of the other actuators and has only one armature associated therewith in this illustrative embodiment. The clappers 22 are pivotally mounted at 52 with respect to the base plate 40 (also shown in FIGURE 2). The clapper assembly is shown in more detail in FIGURES 8 and 9. At the end opposite the pivotally connected end, shafts 54 are connected. The movable pulleys are mounted on these shafts.

The movement of the shafts 54 is limited by the size of the apertures 56 in the rear plate or support member 58. The shafts 54, shown in FIGURE 5, are respectively associted with the movable pulleys $28_3$ and $28_4$. Hence the apertures 56 indicated on FIGURE 5 are of such a size as to permit the movement of the clappers 22 a distance of .040 and .080 inch. The clappers are shown in the actuated position in FIGURE 5—that is, pulled toward the coil. When either of the actuators 20 are deenergized, the associated movable pulleys $28_3$ or $28_4$ will return to the edge 60, because of the force exerted on the pulleys by the spring 34 which is transmitted through the drive band 30. Of course, apertures (not shown) are also associated with movable pulleys $28_1$ and $28_2$ shown in FIGURE 4 which respectively limit the movement of the clappers connected to these pulleys to .010 and .020 inch. Further, note that pulley $28_1$ is located at the end of the drive band 30 farthest from the return spring 34. Thus it encounters the largest amount of friction. However, it also travels the least distance. The clapper associated with pulley $28_1$ may use an air gap of approximately .015 inch; so the actuator 20, associated with this clapper, exerts the greatest amount of initial pull-in force.

Figure 9:
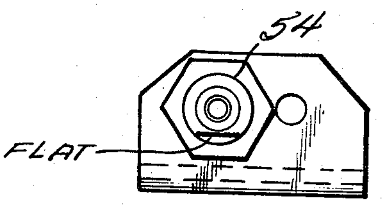
FIGURE 9 is an end view of the clapper of FIGURE 8.

In FIGURE 9 it can be seen that the shaft 54 is flat on one side thereof. This side corresponds to the edge of shaft 54 which substantially contacts the edge of the aperture 56 when the clapper is in its actuated position. The purpose of this flat edge is to provide a means for adjusting the distance that the clapper will travel when actuated. This adjustment is important since it eliminates the need for relying on close tolerances when manufacturing the shafts 54 and the apertures 56—that is, the positioning of a character within the projection system depends on the distance traveled by the shafts 54 and if the distance traveled by these shafts 54 cannot be accurately predetermined, then the probability that the desired character will not be accurately positioned or centered within the projection system increases. However, by rotating the flat edge of the shaft 54 with respect to the edge of the aperture 56, the distance the shaft travels can be adjusted, thereby assuring an accurate positioning of all characters within the projection system without having to resort to close manufacturing tolerances of these shafts. It is also noted that mounting of the pulleys $28_1$–$28_4$ to the shafts 54 basically insures that the shafts will contact the travel limiting edge of aperture 56 in the same place each time since the pulleys are fixed in space with respect to the clappers 22, thus making the device more predictable and reducing the centering error.

Thus it has now been shown that the device mechanism 48 is capable of converting binary data applied to it into the translational motion of the movable pulleys $28_1$–$28_4$, which in turn transmits a rotational movement to the image mask 16.

Figure 10:
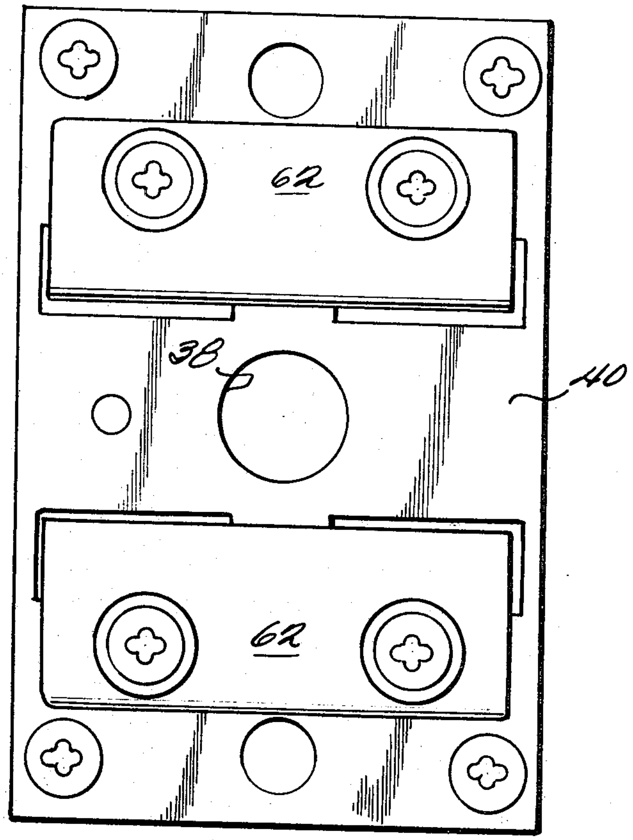
FIGURE 10 is a front view of the mechanism shown in FIGURE 4.

As shown in FIGURE 10, the clappers are retained and positioned in groups of two by an adjustable clapper retainer 62, which allows a uniform gap to be maintained between the clapper 48 and the pivot point 52 which insures a smooth operating clapper.

Figure 7:
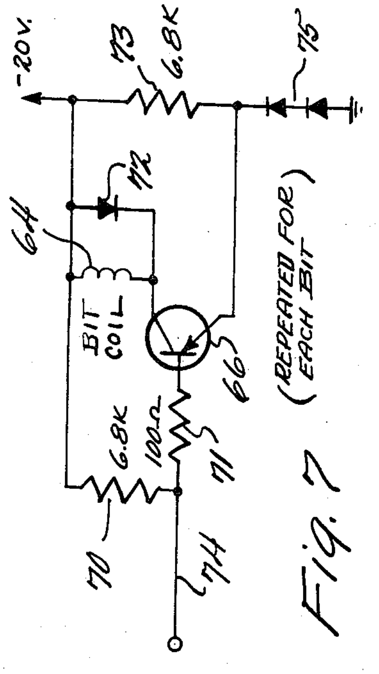
FIGURE 7 is an electrical schematic of one binary circuit with associated electronics for increasing the input to the coil.

Reference should now be made to FIGURE 7 which shows an electrical schematic of one binary circuit with associated electronics for decreasing the input power required for the coil, if required. The drive circuit shown in FIGURE 7 is associated with only one of the actuators 20 of the drive mechanism 48, there being independent drive circuits respectively associated with the other actuators. Illustrative values of the components, together with operating voltages are given on the schematic for the purpose of illustrating an operational embodiment of the invention. The coil 64 for the actuator is connected in series with a drive transistor 66, which is shown as a PNP type. The transistor 66 is biased by the resistors 70, 71, and 73 together with the diodes 75. The diode 72 is connected in parallel with the coil 64 and absorbs the reverse voltage transcient. The transistor 66 is normally off, while the coil 64 is normally not energized. Typical logic signal levels on the input line 74 to the base of transistor 66 are —.5 volt corresponding to ZERO and —3.5 volts corresponding to ONE. When a —.5 volt signal, corresponding to logical ZERO, is applied to transistor 66, it is insufficient to turn the transistor on to energize the coil 64. However, when the —3.5 signal, corresponding to logical ONE, is applied to transistor 66, sufficient current is drawn to energize the coil 64 and position the object screen 16 in the manner described above.

Although PNP transistor circuit logic has been described with respect to FIGURE 7, of course, NPN logic can also be used by reversing the operating voltages.

Thus there has now been described apparatus for displaying characters selectable by binary data in an intelligible format, the apparatus comprising a projection system (lamp 12, condensing lens 14, projection lens 18, and image screen 10) which projects images on the image screen (the term "images" being employed in its broad sense as defined hereinbefore) where each of the images respectively correspond to the information represented by the binary data. In other words, one combination of binary data will correspond to one piece of information and another combination of binary data will normally correspond to another piece of information. The images would, of course, be in the format which is suitable for visual interpretation.

The display apparatus further comprises a movable member (the image mask 16) incorporating the abovementioned images and drive means (the drive means 48 which basically comprises the pulley adder means 26, together with the actuators 20) for positioning the movable member (mask 16) within the projection system so that the positioned image will be displayed on the image screen 10. The pulley adder means includes at least one movable pulley means (pulley $28_1$, for example) responsive to at least one bit of the binary data applied to the display apparatus.

Because of the design of the apparatus described hereinbefore, it will be apparent to those skilled in the art that this invention can be readily modified so that the color of the characters can be changed and the displayed characters can be locked into display position.

Other objects and advantages, and even further modifications of the invention, will become apparent to those of ordinary skill in the art upon reading this disclosure. However, it is to be understood that this disclosure is illustrative of the invention, and not limitative thereof, the invention being defined by the appended claims.

What is claimed is:

1. Apparatus for displaying images selectable by binary data comprising:

means optically projecting said images on a screen;

a movable member incorporating at least one of said images;

drive means including pulley adder means for positioning said movable member to enable said image to be projected on said screen, said pulley adder means being responsive to said binary data;

said pulley adder means including a plurality of movable pulleys respectively responsive to the bits of said binary data and where said apparatus includes means for respectively limiting the motion of said pulleys so that said movable member is moved to a position which is determined by the order of the bits respectively corresponding to said moved pulleys;

a support member, where said drive means includes cable means interconnecting said pulleys, said cable means being attached to said support member at one end thereof; and fixed pulley means rotatably mounted to said support member, the other end of said cable means being attached thereto, said movable member being connected to said fixed pulley means for rotation therewith, said fixed pulley means being rotated when at least one of said movable pulleys moves in response to a bit being applied thereto.

2. Apparatus as in claim 1 where said drive means includes means for winding said one end of said cable means so that a reference image can be positioned within said projection means, said reference image normally corresponding to the absence of binary data being applied to said pulley adder means.

3. Apparatus as in claim 1 where said drive means includes spring means for biasing the rotation of said fixed pulley and movable member in one direction.

4. Apparatus as in claim 3 where said drive means includes a plurality of actuating means for respectively moving said movable pulleys in respective response to said plurality of bits, the movement of said pulleys being transmitted to said fixed pulley by said cable means for rotation thereof in a direction opposite said one direction.

5. Apparatus for displaying images selectable by binary data in a format suitable for interpretation by an operator on a display screen comprising:

a means for optically projecting images on said screen, said images respectively corresponding to the pieces of information represented by said binary data, said images being in said format;

a movable member incorporating said images;

means for positioning said movable member within said projection means so that at least one of said images will be displayed on said screen;

said positioning means including at least one movable pulley responsive to at least one bit of said binary data;

whereby said image will be positioned within said projection means for display upon the movement of said movable pulley means in response to said bit;

a support member, said movable member having said images disposed around the periphery thereof and being rotatably mounted on said support member, said support member including means for limiting the distance traveled by said movable pulley so that said movable member will rotate to a position where the image positioned within the projection means corresponds to information represented by said bit;

said positioning means further including spring means mounted on said support member for biasing the rotation of said movable member against the effect of said movable pulley on said images containing members; and wherein said positioning means further includes at least one actuator means having at least one armature connected to said movable pulley means, said actuator means being responsive to said bit of data.

6. Apparatus as in claim 5 including a shaft mounted on said armature, said movable pulley being rotatably mounted on said shaft and where said means for limiting the distance traveled by said armature constitutes an aperture within said support member, said shaft passing through said aperture, said shaft having a flat edge thereon to facilitate accurate predetermination of the distance traveled by said shaft.

References Cited

UNITED STATES PATENTS

| | | | |
|---|---|---|---|
| 1,008,108 | 7/1911 | Beaumont | 235—132 |
| 2,727,433 | 12/1955 | Nicolaus | 88—24 |
| 3,187,326 | 6/1965 | Nock | 88—24 |
| 3,250,464 | 5/1966 | Caspari | 235—61 |

NORTON ANSHER, *Primary Examiner.*

LEO H. McCORMICK, Jr., *Assistant Examiner.*

U.S. Cl. X.R.

340—378; 235—132; 353—75, 80

UNITED STATES PATENT OFFICE
CERTIFICATE OF CORRECTION

Patent No. 3,418,043

December 24, 19

Gerald I. Williams et al.

It is certified that error appears in the above identified patent and that said Letters Patent are hereby corrected as shown below:

In the heading to the printed specification, line 6, "Central" should read -- Control --.

Signed and sealed this 10th day of March 1970.

(SEAL)
Attest:

Edward M. Fletcher, Jr.
Attesting Officer

WILLIAM E. SCHUYLER, JR.
Commissioner of Patents